CRYOGENIC CIRCUIT FABRICATION

Original Filed March 14, 1962 5 Sheets-Sheet 1

INVENTOR.
JOHN W. BREMER
BY
Samuel E. Turner
ATTORNEY

May 21, 1968 J. W. BREMER 3,383,758

CRYOGENIC CIRCUIT FABRICATION

Original Filed March 14, 1962 5 Sheets-Sheet 2

INVENTOR.
JOHN W. BREMER
BY
Samuel E. Turner
ATTORNEY

May 21, 1968 J. W. BREMER 3,383,758

CRYOGENIC CIRCUIT FABRICATION

Original Filed March 14, 1962 5 Sheets-Sheet 3

INVENTOR.
JOHN W. BREMER
BY
Samuel E. Turner
ATTORNEY

May 21, 1968 J. W. BREMER 3,383,758

CRYOGENIC CIRCUIT FABRICATION

Original Filed March 14, 1962 5 Sheets-Sheet 4

INVENTOR.
JOHN W. BREMER
BY
Samuel E. Turner
ATTORNEY

INVENTOR.
JOHN W. BREMER
BY
Samuel E. Turner
ATTORNEY 3,383,758
Patented May 21, 1968

3,383,758

CRYOGENIC CIRCUIT FABRICATION

John W. Bremer, Phoenix, Ariz., assignor to General Electric Company, a corporation of New York Continuation of application Ser. No. 179,596, Mar. 14, 1962. This application Mar. 9, 1966, Ser. No. 536,558
4 Claims. (Cl. 29—599)

This application is a continuation of application Ser. No. 179,596, filed Mar. 14, 1962, now abandoned.

This invention relates to cryogenic devices and particularly to the fabrication of complex and high density cryogenic circuit configurations.

Certain electrical conductors are known to exhibit a loss of electrical resistance at supercold temperatures approaching absolute zero and to regain resistance in the presence of a certain "critical" magnetic field. The critical field depends upon the particular superconductive material as well as its temperature. Superconductive materials requiring comparatively high critical magnetic fields are known as "hard" superconductors while those requiring comparatively low critical magnetic fields are known as "soft" superconductors.

Superconductors can be used to form a cryotron or superconductive switch. In the preferred thin-film form the cryotron comprises a gate conductor film in the order of 0.3–1.0 micron thickness of soft superconductive material which is crossed by a narrow control conductor film also in the order of 0.3–1.0 micron thickness insulated therefrom and preferably formed of hard superconductive material. Both the gate conductor and the control conductor are thus normally in the superconducting state. If sufficient current is caused to flow through the control conductor the resulting magnetic field causes the gate conductor to become resistive in the region of the crossover.

Large numbers of such cryogenic devices may be interconnected to form large capacity switching and computing circuit assemblies as exemplified in a U.S. Patent No. 3,004,705 entitled Superconductive Computer and Components Therefor, issued to John W. Bremer on Oct. 17, 1961 and assigned to the same assignee as the present invention.

Because of low heat losses, cryogenic devices of the thin-film form may be greatly miniaturized and formed on a small area. For example, it is desirable to form at least 350 cryotrons with interconnecting conductors on a single substrate.

Cryogenic assemblies have typically been formed by a masking technique wherein the soft superconductive gate forming material is deposited on a suitable substrate through a pattern defining mask. A pattern of insulating material is next deposited through a second pattern defining mask. The hard superconductive control forming material is then deposited through a third pattern defining mask.

In a complex circuit many interconnecting conductors are usually required. Some of these interconnecting conductors may usually be formed in the gate and control conductor layers. However, due to mask limitations, several additional layers of conducting material, suitably insulated from the underlying materials, will usually be required to provide the requisite control conductors.

The layer containing the control conductors is usually the most complex and dense especially when it is attempted to include therein as many of the interconnecting conductors as possible to thereby reduce the number of additional layers required for interconnecting conductors. In such a case the pattern defining mask becomes flimsy and fragile, making it difficult and expensive if not impossible to fabricate and use. Furthermore, the design of the mask must ordinarily be such that both ends of narrow strips of the mask are supported. Also, the narrow strips of a mask must ordinarily be straight whereas from a design standpoint it is often desirable for a conductor to change direction at one or more points. These factors are a severe constraint on the layout of the patterns with the usual result that additional layers are required for interconnecting conductors.

In a large cryogenic system it is desirable to form as much of the cryogenic circuitry as possible on a single substrate in order to avoid the difficulties of making interconnections between substrates such as unreliable connections, undesirable inductance, poor utilization of space and the like.

Thus it is desirable to form cryogenic circuit assemblies on relatively large substrates, on the order of 3 by 4 inches or larger. It is difficult to construct the necessary large masks for accurate deposition of conductor patterns so that characteristics are uniform because large complex masks tend to warp and thereby cause variable shadowing, that is, irregular conductor edges. Thus with the masking technique it has been impractical to form dense conductor patterns with masks having dimensions greater than about two inches.

This problem may be overcome to some degree by using many small masks and depositing only a small area of a pattern at a time. However, this process increases the time and cost of fabrication and introduces the problem of registration of the separately deposited portions.

It is therefore an object of the invention to provide improved cryotron and cryogenic circuit assemblies.

It is a more specific object of the invention to fabricate dense and complex cryogenic circuit assemblies.

Another specific object of the invention is to provide a complex thin-film cryogenic circuit assembly having first and second conducting layers wherein the first layer includes a pattern of gate conductors and the second layer includes a pattern of control conductors and wherein all interconnecting conductors are included in the first and second layers whereby additional conducting layers for interconnecting conductors are not required.

Another object of the invention is to form large amounts of cryogenic circuitry on a single substrate.

Another object of the invention is to form complex cryogenic circuits on relatively large substrates having dimensions on the order of four inches and greater.

It is a further object of the invention to more accurately fabricate cryogenic circuit assemblies of predetermined characteristics.

These and other objects of the invention are achieved by employing a photoetching process to form, at least, the pattern of control and interconnecting conductors of the control conductor layer as is more fully explained in the following detailed description of the present invention with reference to the accompanying drawings in which.

Figure 1:
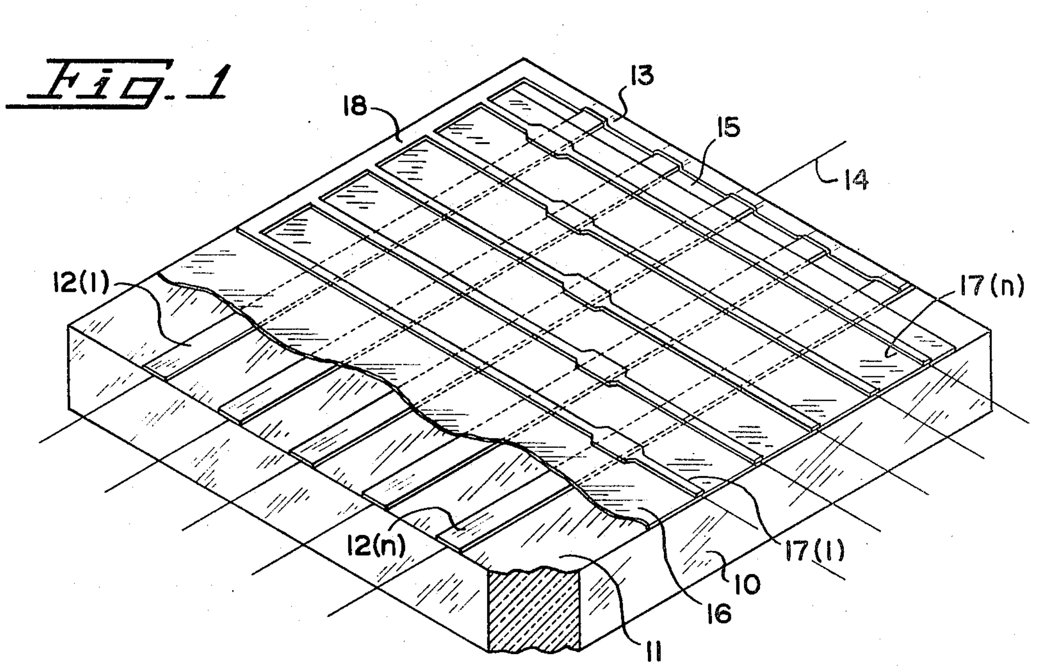
FIGURE 1 is a perspective view illustrating an example of a thin-film cryotron circuit assembly.

Shown in FIG. 1 is a superconductive switching matrix as an example of a cryotron circuit assembly for the purpose of explaining the fabricating method of the present invention.

While the illustrated switch is a relatively simple cryogenic circuit it will serve to illustrate how the fabrication method of the present invention may be applied to more complex circuits such as a thin-film form of the circuits shown in the above-mentioned Patent No. 3,004,705.

Figure 2:
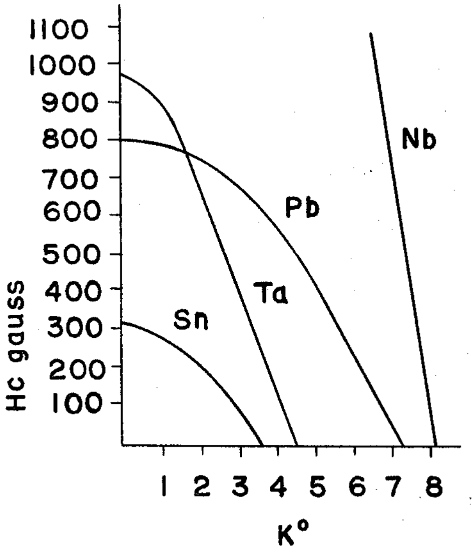
FIGURE 2 is a graph of critical magnetic field versus temperature for various superconductors.

FIG. 2 illustrates the relative critical magnetic fields ($Hc$) for exemplary superconductive materials with the field strength required to return the material to its resistive state plotted against operating temperature. Cryotron circuits may be conveniently operated at a temperature of around 3.6 degrees Kelvin (K.). In such case the exemplary materials tin (Sn) and tantalum (Ta) are soft superconductive materials, that is, a relatively low magnetic field causes them to become resistive, and lead (Pb) and niobium (Nb) are hard superconductive materials.

The switching matrix of FIG. 1 is shown and described in a copending U.S. patent application Ser. No. 78,118, entitled, Cryogenic Circuitry, filed by Vernon L. Newhouse and John W. Bremer on Dec. 23, 1960, and assigned to the same assignee as the present invention.

The construction and operation of the switching matrix is briefly as follows. A substrate for supporting the cryotron circuitry comprises a suitable base 10 having an insulating film or surface 11. (In some applications it is desirable to provide a shield plane beneath the cryogenic circuit. In such a case the base or substrate 10 may be formed of superconductive material. Alternatively, the substrate 10 may be formed of a material such as glass and a thin film of superconductive material may be provided between the substrate and the insulating film 11.)

Formed on the insulating surface 11 is a plurality of thin strips of soft superconductive material such as tin which form a plurality of gate conductors **12(1)–12(*n*). A film of insulating material 16 is formed over the gate conductors and over the substrate except for a strip 15** which is left uncovered to expose the ends of the gate conductors.

Formed over the insulating film 16 is a plurality of strips of hard superconductive material such as lead which form a plurality of control conductors **17(1)–17(*n*). The control conductors are connected together at one end by a strip 18. A strip 13, which is preferably continuous with strip 18, makes electrical contact with the ends of the gate conductors 12(1)–12(*n*) and with a common lead 14**.

When a current of sufficient magnitude is caused to flow in a selected control conductor, the resulting magnetic field causes the gate conductors to become resistive except for the one gate conductor beneath the wide segment of the control conductor as is explained in the above-mentioned application Ser. No. 78,118. For examples, if control conductor 17(1) is selected all of the gate conductors become resistive except gate conductors **12(*n*)**.

As mentioned hereinbefore the gate conductors of a cryogenic circuit assembly are generally wider than the control conductors and the gate conductor pattern is generally less dense than the control conductor pattern. For example, a gate conductor may have a width in the order of 0.04 inch whereas the control conductor pattern may have control conductors of about 0.002 inch in width and conductor spacing of 0.010 inch. Therefore, in the detailed embodiment of the present invention only the control conductor pattern is formed by the photoetching process, the gate conductor and insulating layers being formed by the conventional masking technique. It is specifically pointed out however that where considerations such as the width of gate conductors and density of the gate conductor pattern make it desirable, the gate conductor pattern also may be formed by a photoetching process in a manner similar to that set forth hereinafter for forming the control conductor pattern.

In order to illustrate some of the difficulties with the prior art masking technique the use of this technique in the process of fabricating the matrix switch of FIG. 1 will first be described after which the fabrication of the matrix switch according to the present invention will be described to show how these difficulties are overcome thereby.

Figure 3:
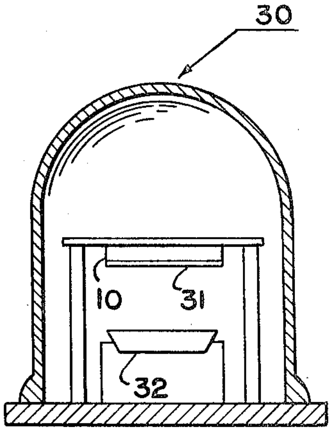
FIGURE 3 is a general illustration of evaporation apparatus.
Figure 4:
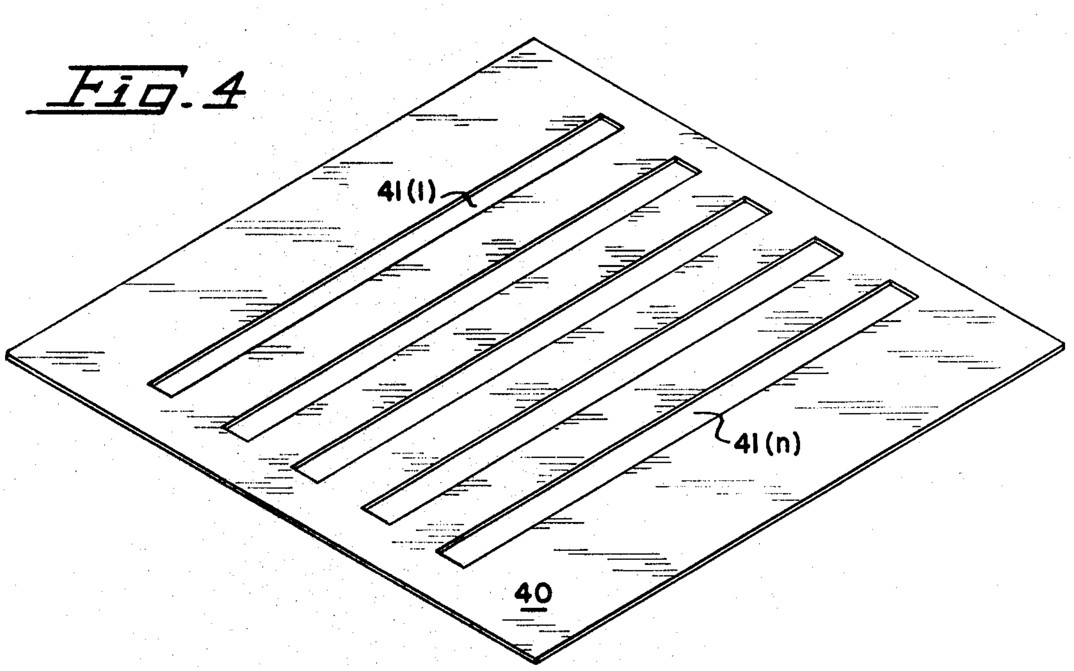
FIGURE 4 is an illustration of a mask for depositing the gate conductors of the assembly of FIG. 1.

To form the pattern of gate conductors **12(1)–12(*n*) on the insulated surface 11 of the base or substrate 10, the substrate 10 is placed in a conventional film evaporating apparatus indicated generally as 30 in FIG. 3. Shown in FIG. 4 is a mask 40 having a series of elongated cutouts 41(1)–41(*n*) corresponding to the gate conductors 12(1)–12(*n*). The mask 40 is placed next to the base 10 as indicated by 31, FIG. 3. The atmosphere of the evaporating apparatus is evacuated (by means not shown) and superconducting material such as tin is evaporated from a boat 32** whereby a film of the material is deposited on the substrate in the pattern defined by the mask.

Figure 5:
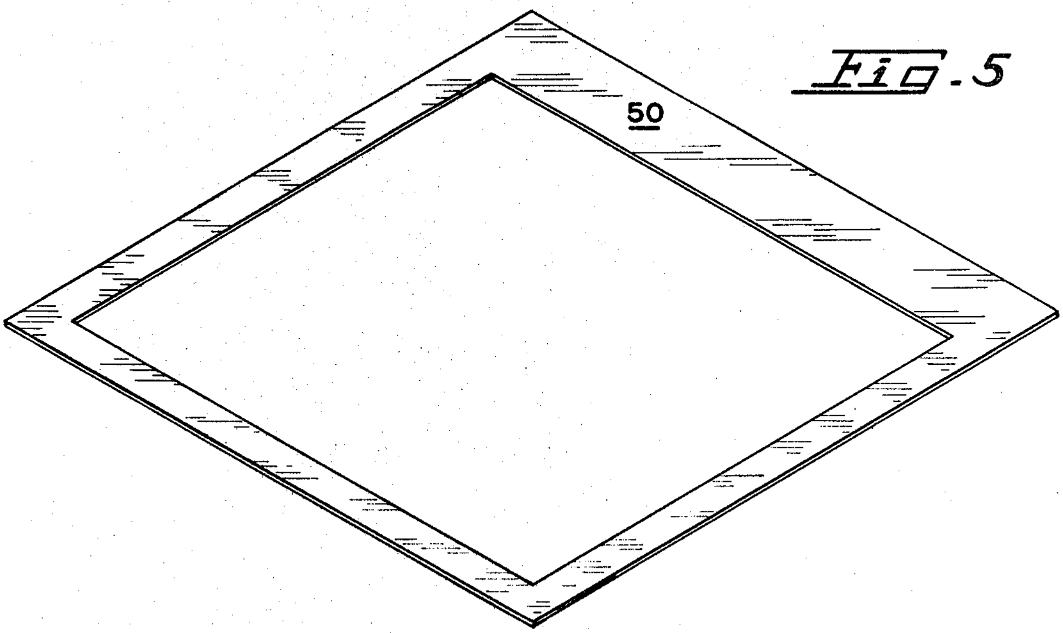
FIGURE 5 is an illustration of a mask for depositing the layer of insulating material of the assembly of FIG. 1.

The insulating layer 16 is next formed by evaporating a film of suitable insulating material such as silicon monoxide through a pattern defining mask, such as a mask 50 shown in FIG. 5, over the gate conductor layer. In the present example the pattern defining mask is formed to prevent deposition of the insulating material in the area 15 to thus leave the ends of the gate conductors exposed.

Figure 6:
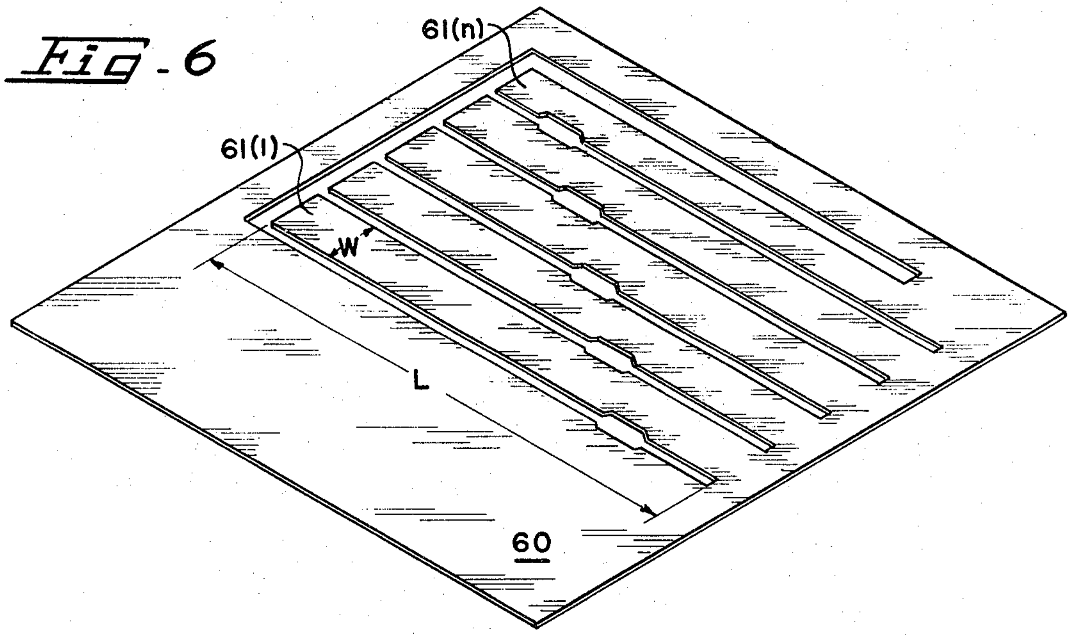
FIGURE 6 is an illustration of an impractical mask which would be required to deposit the control conductor layer in a single step.

The control conductor layer comprising the control conductors **17(1)–17(*n*) and interconnecting conductors 13 and 18 is next to be formed. Referring to FIG. 6 it is seen that in order to form this control conductor layer pattern by the prior art masking technique in a single layer, a mask illustrated as a mask 60 is required. However, such a mask is generally impractical because of the unsupported ends of a series of mask strips 61(1)–61(*n*). It will be appreciated that it is difficult to construct such a mask which will remain flat because strips which are supported at only one end tend to twist or curl. This is particularly true when the strip width W is relatively small and the strip length L is relatively large. For example, as mentioned hereinbefore, in a dense cryogenic circuit pattern it is desirable to form conductors having a length L in the order of four inches or more and with spacing W between conductors in the order of 0.010 inch. It is thus generally impractical to form a mask having the shortcomings of mask 60**.

Therefore to form the control conductor layer pattern by the masking technique additional conducting layers are usually required to contain at least some of the interconnecting conductors. For example, the control conductors **17(1)–17(*n*) and the interconnecting conductor 13 may first be deposited by the use of a mask such as a mask 70 illustrated in FIG. 7 which has formed therein a series of cutouts 17(1)–71(*n*) corresponding to the control conductors 17(1)–17(*n*) and a cutout 73 corresponding to interconnecting conductor 13**.

Figure 8:
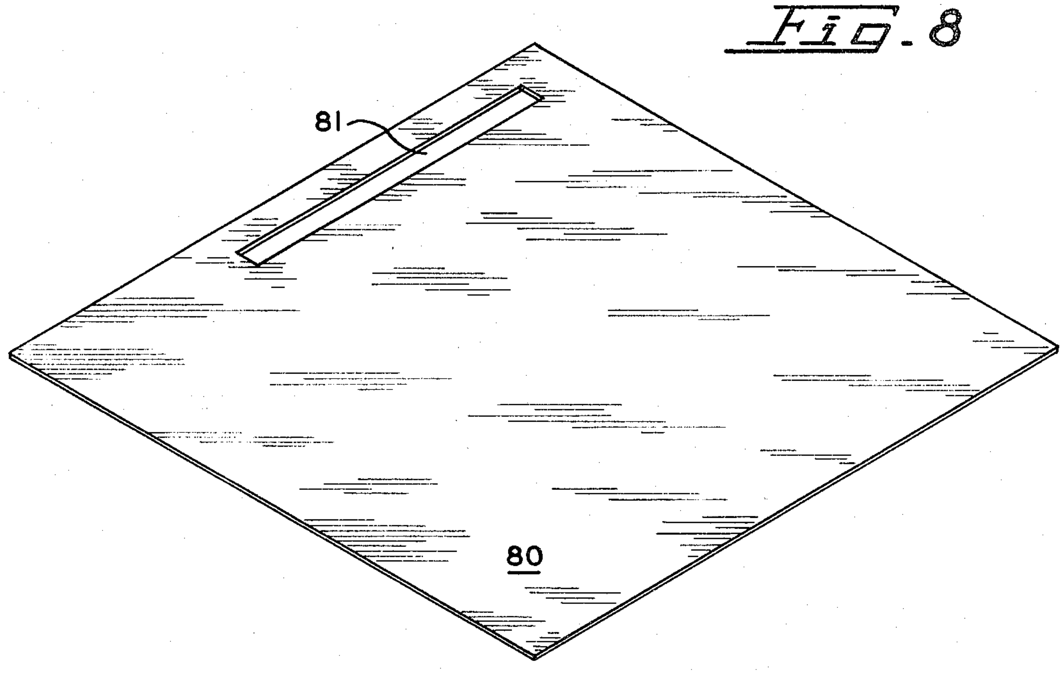
FIGURE 8 is an illustration of a mask for depositing an interconnecting conductor in an additional layer.

The interconnecting conductor 18 is then deposited in an additional layer to make electrical contact with the left ends of control conductors **17(1)–17(*n*) and interconnecting conductor 13 by the use of a mask such as a mask 80, illustrated in FIG. 8, which has a cutout 81 corresponding to the interconnecting conductor 18**.

Thus, even for the relatively simple cryogenic circuit illustrated in FIG. 1 an additional conducting layer is needed to form the interconnecting conductors when the circuit is fabricated by the masking technique. In fact for complex circuits as many as sixteen additional conducting layers have been needed for interconnecting conductors.

In addition to the time and expense of depositing these additional layers the difficulty of depositing each layer so that it is in proper registration with the underlying layers is readily apparent.

Figure 7:
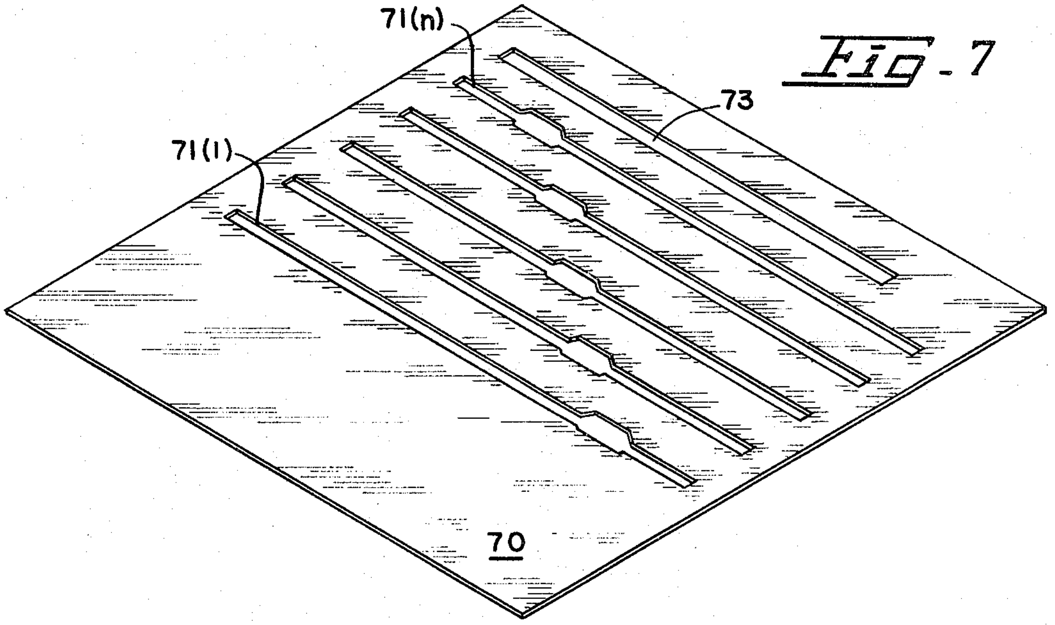
FIGURE 7 is an illustration of a mask for depositing part of the control conductor layer.

Also, even with masks such as mask 70 shown in FIG. 7 wherein both ends of the strips are supported, it is difficult to accurately deposit closely spaced narrow conductors because the strips tend to twist and warp and cause variable shadowing, that is, the mask does not make uniform contact so that the evaporated material is deposited irregularly along the edges of the mask strips. This difficulty will be further appreciated by considering that mask strips would have to be four inches long or more and a few hundredths of an inch wide to achieve the desired circuit density on large substrates.

Figure 9:
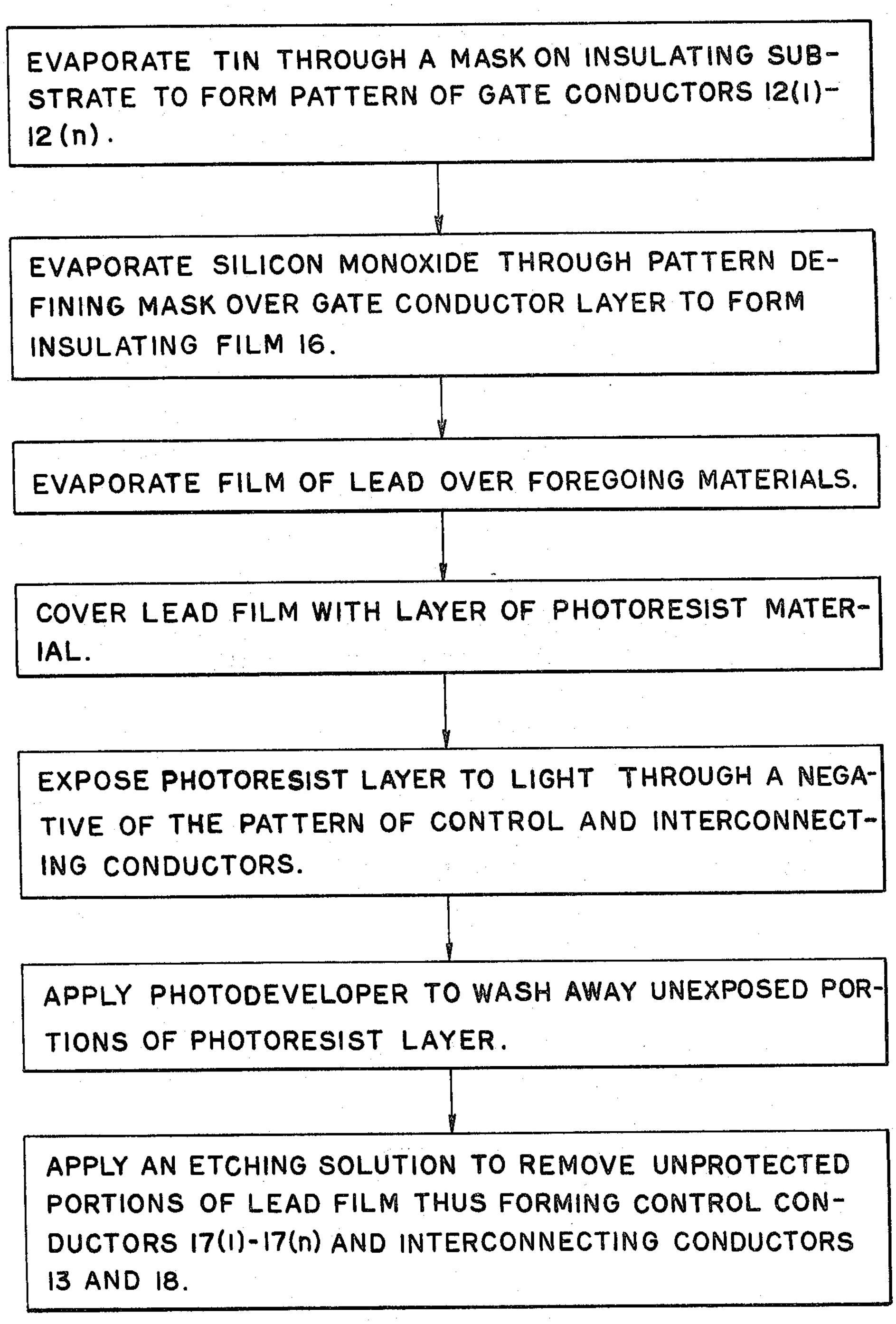
FIGURE 9 is a diagram of the steps of the process of fabricating the cryotron circuit assembly of FIG. 1 according to the present invention.

The foregoing difficulties among others of the prior art masking technique may be overcome and dense cryogenic circuits may be formed with great accuracy on relatively large as well as small substrates by using the photoetching process of the present invention to form at least the control conductor layer as shown in FIG. 9 which sets forth the steps of fabricating the cryogenic circuit of FIG. 1 according to the present invention. Also, all of the required interconnecting conductors may be formed in the gate and control conductor layers thus eliminating the difficulties of depositing multiple interconnecting conductor layers.

As mentioned hereinbefore, where the complexity or other factors make it desirable the gate conductor layer may be formed by a photoetching process similar to the process described hereinafter for the control conductor layer. However, for the purpose of illustrating the present invention it is assumed that the gate conductor layer is deposited by evaporation through a suitable mask, such as the mask 40 of FIG. 4 for depositing the gate conductors 12(1)–**12(*n*)** of the present example, as described hereinbefore.

Thus, assuming that the gate conductors 12(1)–**12(*n*) have been formed on the insulating film or surface 11, FIG. 1, and that the insulating layer 16 has been formed over the gate conductor pattern by evaporation of the insulating material through the mask 50, FIG. 5, as described hereinbefore, the formation of the control conductor layer pattern, comprising control conductors 17(1)–17(*n*) and the interconnecting conductors 13 and 18**, in accordance with the principles of the present invention will now be described by way of example.

The control conductor layer pattern is formed according to the present invention by first depositing, for example by evaporation, a film of superconductive material such as lead over the entire exposed surface of the gate conductor and insulating layers. The pattern of control and interconnecting conductors in then formed by the photoetching process substantially as follows:

The lead film is covered with a layer of photoresist material such as Kodak KPR photoresist which may conveniently be applied by spraying or dipping.

The layer of photoresist material is dried, for example by spinning the assembly in appropriate spinning apparatus (not shown) and/or by baking in an oven.

The photoresist layer is then exposed to light through a negative of the desired pattern of control and interconnecting conductors. To achieve accuracy of dimensions of the pattern, the negative is preferably produced by first producing a greatly enlarged art master copy of the control conductor layer pattern. The art master is then photographed and the negative of the pattern is produced by photographic reduction preferably in the order of 10 to 1 or more.

The portions of the photoresist layer which are exposed to light become relatively insoluble thus forming a protective image pattern. For the suggested photoresist material the light source may be, for example, a 90 ampere arc lamp lighted for about one minute at a distance of about 30 inches.

A solution such as Kodak Photoresist Developer No. 1156 is next applied by immersing the assembly in the solution for a period of about six minutes after which the assembly is rinsed in distilled water or fresh developer. These latter two steps result in a washing away of the unexposed photoresist material whereby the desired pattern of the lead film is protected and the undesired portions are now exposed.

The exposed portion of the lead film is now etched away leaving the pattern of control and interconnecting conductors as protected by the photoresist material.

A suitable etching solution is an aqueous ammonium molybdate solution at a temperature of about 20 degrees centigrade comprising 96.5 ml. of a saturated ammonium molybdate compound, $(NH_4)6Mo_7O_{24}\cdot 4H_2O$, to which is added 50 ml. of concentrated nitric acid (70 perecnt $HNO_3$) and 640 ml. of distilled water.

The etching solution is applied to remove the unprotected portions of the lead film, for example, by immersing the assembly in the etching solution, for a period of 15–22 seconds.

Immediately following the etching period the assembly is washed in distilled water or sodium hydroxide for about 22 seconds to remove any adhering etching solution.

Immediately following this washing any adhering water is removed, for example, by immersing the assembly in ethanol, to prevent undesirable oxidation of the edges of the lead strips which have been formed.

The photo-sensitized protective resist material may now be removed by immersing the assembly in a resist remover solution such as Kodak Thinner No. 1121 for a period of about 10 seconds after which the assembly is again washed in ethanol.

The now completed control and interconnecting conductor pattern may be protected from damage due to handling or the like by applying a protective coating of a film-forming organic polymer such as methylmethacrylate thereto.

As explained hereinbefore a cryotron switch is formed by a control conductor crossing a gate conductor. Also, the aforementioned application No. 78,118 discloses how inactive crossovers can be formed. The number of crossovers per unit area, active and inactive, is one measure of the density of a cyrogenic circuit. Cryogenic circuits having at least 700 crossovers, at least one-half of which are active, and having all the interconnecting conductors in the gate and control conductor layers with interconnecting conductors of about 0.010 inch in width spaced by a like distance and with control conductors having a width of about 0.002 inch within plus or minus ten percent have been fabricated according to the present invention on a substrate area of twelve square inches.

This density and accuracy would be difficult and expensive if not impossible to achieve with the prior art masking technique of forming the conrtol conductor pattern.

Furthermore, the design of cryogenic circuit assemblies fabricated according to the present invention may be easily and accurately changed by modifying the enlarged art master. This is in contrast to the difficulty and expense of producing a different mask as required for design changes when the prior art masking technique is employed.

Also, complicated and extensive cryogenic circuit assemblies may be accurately fabricated according to the present invention on large substrates, having dimensions of four inches and more, whereas large masks of complex patterns result in impractically long and narrow mask strips and undue constraint on circuit pattern design.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. A method of fabricating a thin-film superconductive circuit on an insulating substrate comprising the steps of: placing said substrate in a high-vacuum atmosphere; evaporating on said substrate through a pattern defining mask a first pattern of superconductive material; forming a film of insulating material over selected portions of said first pattern; evaporating a film of superconductive material having a thickness of less than 10 microns over said foregoing materials; removing said substrate from said atmosphere; selectively removing portions of said film of superconductive material to form a second pattern of superconductive material; and placing said circuit in an environment wherein said superconductive material is normally in the superconductive state.

2. A method of fabricating a thin-film superconductive circuit assembly on a substrate comprising the steps of: placing said substrate in a high-vacuum atmosphere; forming on said substrate a pattern of first superconductive material; covering selected portions of said first superconductive material with a film of insulating material; forming a film of second superconductive material having a thickness of less than 10 microns over said foregoing materials; removing said substrate from said high-vacuum atmosphere; forming a pattern of etchant resist material on said second superconductive material to protect selected portions thereof; applying an etching solution to said assembly to etch away the unprotected portions of said second superconductive material; and placing said assembly in an atmosphere wherein said circuit is normally superconductive.

3. A method of fabricating a thin-film superconductive circuit assembly on a substrate comprising the steps of: forming on said substrate a pattern of first superconductive material; covering selected portions of said first superconductive material with a film of insulating material; forming a film of second superconductive material having a thickness of less than 10 microns over said foregoing materials; coating said second superconductive material with a photosensitive etchant resist material; exposing selected portions of said resist material to light thereby forming a protective pattern thereof on said second superconductive material; removing the unexposed portions of said resist material; applying an etching solution to etch away the unprotected portions of said second superconductive material; and placing said fabricated assembly in an environment wherein said superconductive material is normally in the superconductive state.

4. A method of fabricating a thin-film superconductive circuit assembly on a substrate comprising the steps of: depositing on said substrate through a pattern defining mask a pattern of first superconductive material; covering selected portions of said first superconductive material with a film of insulating material; forming a film of second superconductive material having a thickness of less than 10 microns over said foregoing materials; coating said second superconductive material with photosensitive etchant resist material; exposing selected portions of said resist material to light thereby forming a protective pattern thereof on said second superconductive material; removing the unexposed portions of said resist material; applying an etching solution to etch away the unprotected portions of said second superconductive material; and placing said assembly in an environment wherein said superconductive material is normally in the superconductive state.

References Cited

UNITED STATES PATENTS

| | | |
|---|---|---|
| 2,777,192 | 1/1957 | Albright et al. |
| 3,058,852 | 10/1962 | Cabwell et al. |
| 3,059,196 | 10/1962 | Lentz. |
| 3,075,866 | 1/1963 | Baker et al. |
| 3,091,556 | 5/1963 | Behrndt et al. |
| 3,100,267 | 8/1963 | Crowe. |

OTHER REFERENCES

An Approach to Microminiature Printed Systems, by Buck and Shoulders, Proceedings of Eastern Joint Computer, 1958, pp. 55–59.

CHARLIE T. MOON, *Primary Examiner.*

P. M. COHEN, *Assistant Examiner.*